US006315269B1

(12) United States Patent
Fleury et al.

(10) Patent No.: US 6,315,269 B1
(45) Date of Patent: Nov. 13, 2001

(54) CABLE SUPPORT BLOCK

(75) Inventors: Rejean Fleury, Delisle; Jocelyn Fleury, Alma; Jean-Pierre Fleury, Delisle, all of (CA)

(73) Assignee: Electro Saguenay Ltée, Delisle (CA)

( * ) Notice: Subject to any disclaimer, the term of this patent is extended or adjusted under 35 U.S.C. 154(b) by 0 days.

(21) Appl. No.: 09/530,862

(22) PCT Filed: Nov. 13, 1998

(86) PCT No.: PCT/CA98/01063

§ 371 Date: May 5, 2000

§ 102(e) Date: May 5, 2000

(87) PCT Pub. No.: WO99/26326

PCT Pub. Date: May 27, 1999

(30) Foreign Application Priority Data

Nov. 18, 1997 (CA) .................................... 9724236

(51) Int. Cl.[7] .................................... B65H 59/00
(52) U.S. Cl. .................. 254/134.3 PA; 254/134.3 R
(58) Field of Search .................. 854/134.3 PA, 854/134.3 R, 134.3 CL; 254/403; 269/75

(56) References Cited

U.S. PATENT DOCUMENTS

| 3,109,627 | 11/1963 | Stanulis et al. . | |
|---|---|---|---|
| 3,130,958 | 4/1964 | McAuley . | |
| 3,134,575 | 5/1964 | Walter . | |
| 3,185,443 | 5/1965 | Eitel . | |
| 3,819,154 | 6/1974 | Miller . | |
| 3,837,623 | 9/1974 | Chadwick . | |
| 3,868,089 | * 2/1975 | Lindsey et al. | 254/134.3 PA |
| 3,908,962 | 9/1975 | Ross . | |
| 4,019,715 | 4/1977 | Vugrek . | |
| 4,129,287 | * 12/1978 | Lindsey et al. | 254/134.3 PA |
| 4,301,994 | 11/1981 | Lindsey . | |
| 4,423,853 | 1/1984 | Davis . | |
| 4,549,723 | * 10/1985 | Castilano | 254/134.3 PA |
| 5,941,507 | * 8/1999 | Page | 254/134.3 PA |
| 5,979,880 | * 11/1999 | Chikiri et al. | 254/134.3 R |
| 6,045,124 | * 4/2000 | Walton | 254/134.3 PA |
| 6,129,340 | * 10/2000 | Daniel | 254/134.3 PA |
| 6,164,609 | * 12/2000 | Eslambolchi et al. | 254/134.3 PA |

FOREIGN PATENT DOCUMENTS

| 359 731 | 9/1922 | (DE) . |
|---|---|---|
| 2 533 771 | 3/1984 | (FR) . |

* cited by examiner

Primary Examiner—Joseph J. Hail, III
Assistant Examiner—Lee Wilson
(74) Attorney, Agent, or Firm—François Martineau

(57) ABSTRACT

The cable support block is for temporarily supporting a lower cable to an upper aerial cable. The support block comprises a rigid arcuate frame having an upper yoke straddling the upper cable, and an idle load-bearing roller rotatably mounted on the frame and supporting the lower cable. An elongated coil spring is fixedly attached at a first end thereof to the frame and defines a second opposite free end portion thereof movable relative to the first end by resilient: deformation of the coil spring. To insert a cable into the arcuate frame, the cable is forcibly abutted against the coil spring which will resiliently yield to allow access of the cable into the arcuate frame by being inwardly deformed.

6 Claims, 3 Drawing Sheets

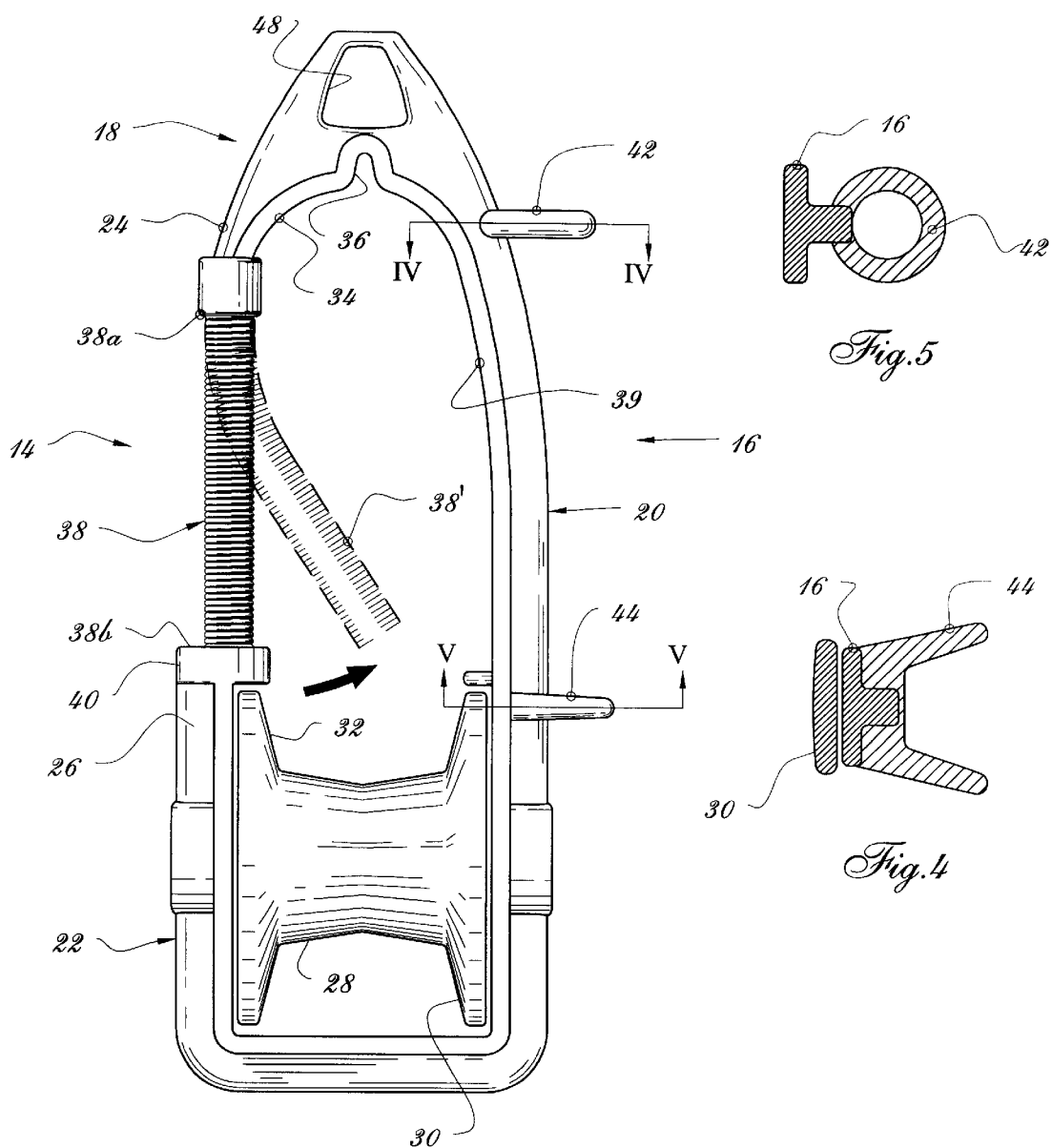

CABLE SUPPORT BLOCK

FIELD OF THE INVENTION

The present invention relates to cables such as power conducting or telecommunication cables, and more particularly to a support block supported on a suspended cable, for installing and/or stringing a new cable supported by the support block.

BACKGROUND OF THE INVENTION

It is known to provide cable support blocks for temporarily supporting power conducting or telecommunication cables or the like, while stringing the cable and installing same. A number of support blocks are temporarily installed on a suspended cable during the stringing/installation operations of a new cable supported by the support blocks, and are to be removed afterwards, once the new cable is permanently attached to the upright cable support posts which are driven in the ground. Thus, a support block allowing easy and quick installation and removal thereof is an asset.

U.S. Pat. No. 4,549,723 issued in 1985 to C. R. Castilano discloses a cable support block which comprises a rigid bracket which can be hooked onto an upper support strand which is spacedly supported over ground by successive upright cable support posts. The lower portion of the bracket is provided with a roller which can support the new cable to be installed or stringed. The roller, being rotatably mounted onto the bracket, allows the new cable to be attached to and tensioned between the successive fixed posts while maintaining minimum friction between the support block and the new cable. Indeed, the workperson installing or stringing the new cable does not have to exert great efforts to pull on the new cable for tightening same between the upright posts, since it can roll on the rollers of the spaced cable support blocks.

To prevent the new cable or the support strand from accidental disengagement from the cable support block, a manually operable pivotable elbowed closure arm is provided on the bracket, which can be pivoted between an open position, in which it is upwardly spaced from the roller and allows access to the new cable and to the support strand to and from the roller, and a closed position, in which it comes in close proximity with the roller, so as to trap the new cable and the support strand in the closed area defined by the combination of the roller, the bracket and the closure arm. A manually operable lever is provided to pivot the closure arm. In use, downward pivotal diplacement of the closure arm will have a dual effect: firstly, the support strand will be clamped by the cam member linked to the lever against the upper hooks, for securely releasably attaching the cable support block to the support strand; and secondly, the closure arm will be correspondingly pivoted into its downward closed position, to prevent accidental escape of the cables from within the support block.

A first disadvantage of the cable support block of the Castilano patent is that it is not substantially symmetrical relative to a vertical plane coinciding with the support strand. Indeed, as seen in front elevation, the bracket and the manual lever are located almost entirely on one side of the cable support block, while only the closure arm partially extends on the side opposite the bracket. The V-shaped hooks and the roller are substantially centered in front elevation, relative to the said vertical plane. This assymmetrical configuration is not desirable, since the cable support block may be prone to tilt laterally under its own weight, especially if it is not loaded with the new cable, and thus manipulation of the cable support block becomes more complex for temporarily installing thereon the new cable.

The main disadvantage of the cable support block of the Castilano patent is that the closure arm does not allow quick and easy access of the new cable onto the supporting roller. Indeed, the closure arm requires forcible operative pivotal displacement of the lever from a substantially upright position into a downward position for concurrently pivoting the closure arm. This downward pivotal displacement requires forcible manual intervention by a workperson at cable height, which requires a human operator to be lifted within an aerial basket or the like device at cable height to install/remove the cable support block. This can become a tedious and time consuming operation, especially in areas where there is irregular terrain under the cables which requires vehicles equipped with aerial baskets to move at a slower pace. Moreover, this operation at cable height can become hazarardous to the workperson, since he will come in close proximity with the upper strand, which can be a power conducting line. When such a case occurs, serious physical injury to the workperson can occur if he gets electrocuted. Also, the person operating high above ground level is prone to accidentally falling from his aerial basket and being seriously injured under a high-velocity impact with the ground.

It is known to provide a support block which is similar to the one shown in the Castilano patent, but which lacks the closure arm disclosed therein. The support block is configured so as to be releasably engageable at the end portion of a conventional telescopic pole used by workpersons installing power lines. The pole allows a workperson to distally handle the support block from ground level, to install/remove the support blocks without leaving ground level. Injury likelihood is significantly reduced since no aerial operations need to be accomplished near the potentially power-conducting cables, at cable height. However, such conventional support blocks have an important disadvantage. Indeed, the fact that there is no closure arm allows the new cable being installed to accidentally escape its engagement upon the support block roller and fall down, and also allows the support block to accidentally fall from the support strand. This is highly undesirable, and the closable support block of the Castilano patent has been designed to circumvent this problem.

U.S. Pat. No. 3,837,623 issued in 1974 to W. H. Chadwick, Jr., describes a bundle block which is especially adapted to be used in stringing conductors, with a pilot or pulling line being supported and gradually released by a helicopter. The Chadwick patent includes a frame supporting three axially adjacent rollers, and a guide arm laterally extending in an upwardly inclined fashion from the axially outward extremity of the rollers. The frame defines an opening allowing access to the tangentially upper portion of the rollers, and a gate finger is pivotable on the frame to close this opening. Indeed, a torsion spring continuously urges the gate finger into a closed position, in which the finger abuts against a horizontal detent pin. In use, the line or cable is released by the helicopter and downwardly slides along the upwardly inclined guide arm to abut against the pivotable gate finger. Under the load of the cable, the pivotable gate finger is pivoted into an opened position against the action of the torsion spring, thus allowing access to the cable onto the upper portion of the rollers, to be rollably supported thereby. Once the cable slides onto the roller, the gate finger is released to be urged into its closed position by the torsion spring. Thus, accidental escape of the cable from within the area defined by the combination of the frame, the rollers and the gate finger, is prevented, since the frame opening is closed by the gate finger which outwardly abuts against the fixed detent pin.

The Chadwick bundle block thus allows easy engagement of the cable therein, without requiring manual intervention to open the detent pin. However, it does not allow an easy disengagement of the cable therefrom, since the gate finger must be manually forcibly pivoted against the action of the torsion spring to allow the cable to be removed therefrom. Thus, intervention by a workperon at cable height is required, with the above-mentioned disadvantages. If many bundle blocks such as the one shown in the Chadwick patent were to be used for supporting the cable being stringed, the removal of the bundle blocks would become a tedious and time consuming operation, in addition to being hazardous to the workpersons accomplishing this operation, due to the height at which the operation is being accomplished and to the proximity of the power-conducting lines.

OBJECTS OF THE INVENTION

It is the gist of the present invention to provide a cable support block that allows a new cable being installed and possibly stringed to be temporarily supported by another overhanging fixed cable, and that the support block allow easy and secure engagement and disengagement thereof with and from the cables.

It is an important object of the present invention that the support block allow distal handling thereof with a manually operable pole, for allowing a workperson to operate at ground level for installing/removing the support block on and from the suspended cables.

SUMMARY OF THE INVENTION

The present invention relates to cables such as power conducting or telecommunication cables, and more particularly to a cable support block for temporarily supporting a lower cable to an upper cable spacedly supported over ground, said support block comprising:

a rigid arcuate frame defining an upper yoke for straddling said upper cable, first and second ends and an opening between said first and second ends allowing through-passage into and out of said arcuate frame;

an idle load-bearing roller rotatably mounted on said frame inwardly thereof and under said opening, for supporting the lower cable;

a shoulder mounted on said frame second leg;

an arm member defining a first end and a second opposite free end portion;

an arm member biasing device attached to said frame; characterized in that said support block further comprises:

a universal joint for attaching said arm member first end to said frame first leg, thus allowing said arm member second end portion to be movable relative to said first end between:
  a) a closed position, in which said second end portion lies inwardly adjacent to said shoulder, relative to said arcuate frame, and in which said arm member bridges said opening; and
  b) an opened position, in which said second end portion is located away from said shoulder and said second leg, said arm member consequently allowing access through said opening into and out of said arcuate frame to the lower and upper cables; said arm member second end portion being continuously biased by said biasing device towards said closed position, whereby accidental release through said opening of the upper and lower cables transversely extending inside said arcuate frame can be prevented by said arm member second end portion outwardly abutting against said shoulder when said arm member second end portion is in said closed condition and said arm member bridges said opening.

The present invention also relates to a cable support block for temporarily supporting a lower cable to an upper cable spacedly supported over ground, said support block comprising:

a rigid arcuate frame defining an upper yoke for straddling said upper cable, first and second ends and an opening between said first and second ends allowing through-passage into and out of said arcuate frame;

an idle load-bearing roller rotatably mounted on said frame inwardly thereof and under said opening, for supporting the lower cable;

a shoulder mounted on said frame second leg; characterized in that said support block further comprises:

an elongated coil spring having a first end fixedly attached to said first leg and a second opposite free end portion movable relative to said first end by resilient deformation of said coil spring; said coil spring being deformable between a closed condition, in which said second end portion lies inwardly adjacent to said shoulder, relative to said arcuate frame, and in which said coil spring bridges said opening, and an opened condition, in which said second end portion is located away from said shoulder and said second leg, consequently allowing access through said opening into and out of said arcuate frame to the lower and upper cables, said coil spring being continuously biased by its own intrinsic resiliency towards said closed condition, whereby accidental release through said opening of the upper and lower cables transversely extending inside said arcuate frame can be prevented by the outward abutment of said coil spring second end portion against said shoulder when said coil spring is in said closed condition and bridges said opening.

Preferably, said shoulder is substantially arcuate and is inwardly opened, relative to said arcuate frame, for preventing, when said coil spring is in said closed condition, in addition to an outward displacement of said coil spring second end portion relative to said arcuate frame, a tranversal displacement of said coil spring second end portion relative to said arcuate frame, whereby said coil spring second end portion is allowed an inward displacement, relative to said arcuate frame, when it is in said closed condition.

Advantageously, said frame comprises a first hook member for engagement therewith by a suitable pole for distally handling said support block with the pole.

Preferably, said frame comprises a second hook member for stabilizing said support block by engagement of the pole against said second hook member, in addition to said first hook member, while said support block is distally handled with the pole.

Advantageously, said first hook member is ring-shaped and is tangentially integrally attached to said frame, and said second hook member is V-shaped and has a web portion integrally fixed to said frame and a pair of diverging fingers, said second hook member being attached spacedly under said first hook member so as to form a channel therewith, with the pole engaging said channel through the ring-shaped first hook member and between the fingers of said second hook member.

The invention also relates to a cable support block for assisting in remote retrofitting a first cable to an existing aerial cable network including a second installed aerial cable, said support block defining a main open rigid frame having a top seat, for stationarily hooking said main frame onto said second cable, a bottom seat, for slidingly supporting said first cable beneath said second cable, an access port, for enabling access by said first and second cables through said main frame and toward said top and bottom seats, and a gate, releasably closing said access port; characterized in that said gate has a deformable resilient section so that upon an internally directed load being applied thereto, said resilient section yieldingly deforms towards said bottom seat and clears said access port to constitute a cable sliding access guide ramp for through passage of one of said cables toward and onto said bottom seat, but automatically returns to its access port closing condition upon release of said external load responsively to its resiliency bias.

Preferably, said main frame further includes an arcuate shoulder releasably receiving said gate deformable section, wherein upon forcible release of said gate deformable resilient section from said arcuate shoulder, said gate deformable section is tiltable transversely from said arcuate shoulder and away from said support block main frame and clears said access port to constitute a cable egress sliding guide ramp for escape and release of one of said cables from said main frame.

DESCRIPTION OF THE DRAWINGS

In the annexed drawings:

FIG. 3 is a front elevation of the cable support block, at an enlarged scale, suggesting in dotted lines an alternate position of the coil spring; and FIGS. 4 and 5 are cross-sectional views respectively taken along lines IV—IV and V—V of FIG. 3.

DETAILED DESCRIPTION OF THE EMBODIMENTS

Figure 1:
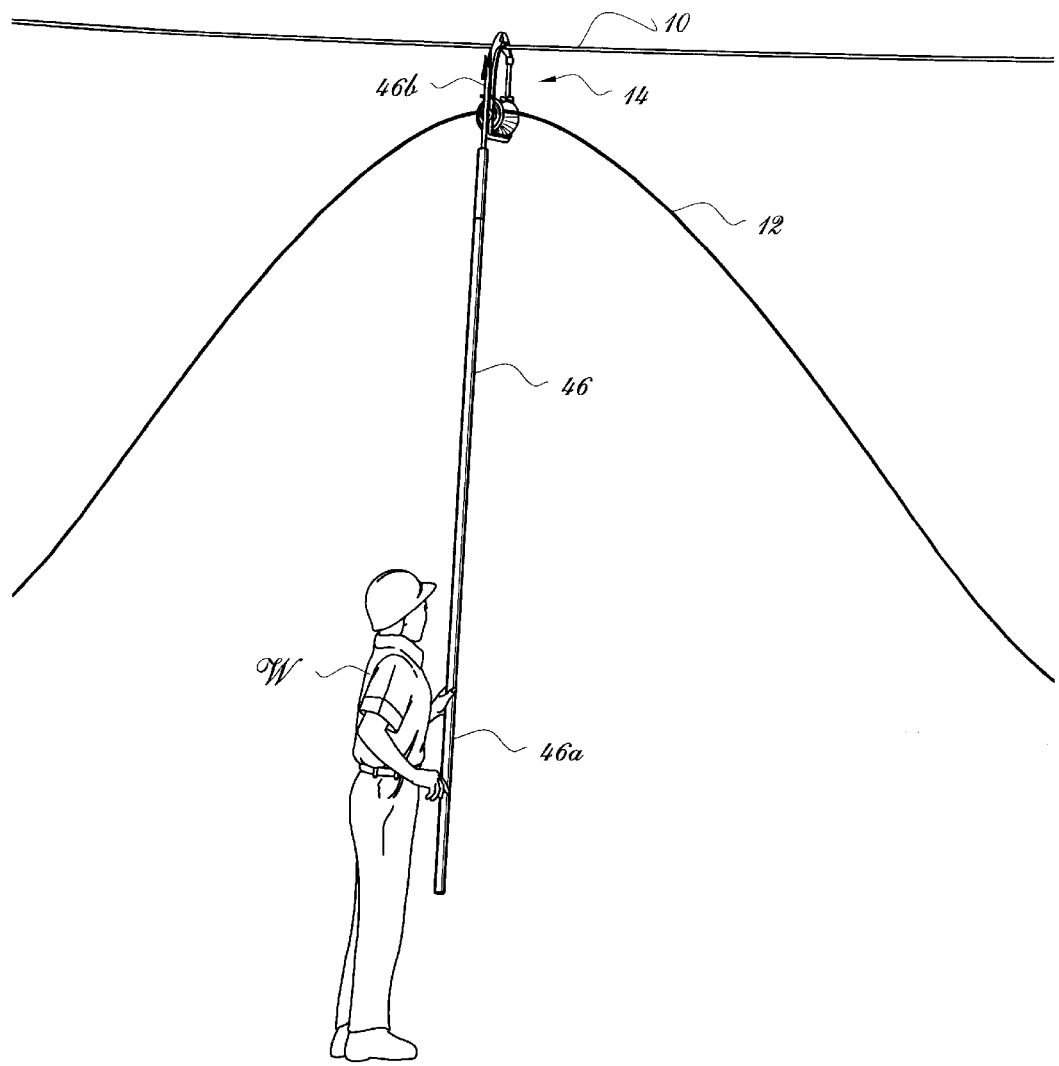
FIG. 1 is a perspective view of a work person installing a cable support block according to the invention on an upper cable spacedly supported over ground, with a lower cable to be installed and possibly stringed being supported by the cable support block.

FIG. 1 shows an upper cable 10 fixedly attached to spaced-apart upright support posts (not shown), with the upper cable 10 thus being spacedly supported over ground in a conventional manner. A lower cable 12 to be installed and possibly stringed is to be supported temporarily under the upper cable by a number of cable support blocks 14 according to the invention, until the final attachment to the posts can be accomplished when the stringing operation is completed, and when the lower cable 12 is ready to be suitably tensioned between the posts, as known in the art. Although the present invention is particularly designed for use with power conducting cables or telecommunication cables, it is understood that it is not restricted to such use, and that cables of any suitable nature may be supported with cable support blocks such as block 14.

Figure 2:
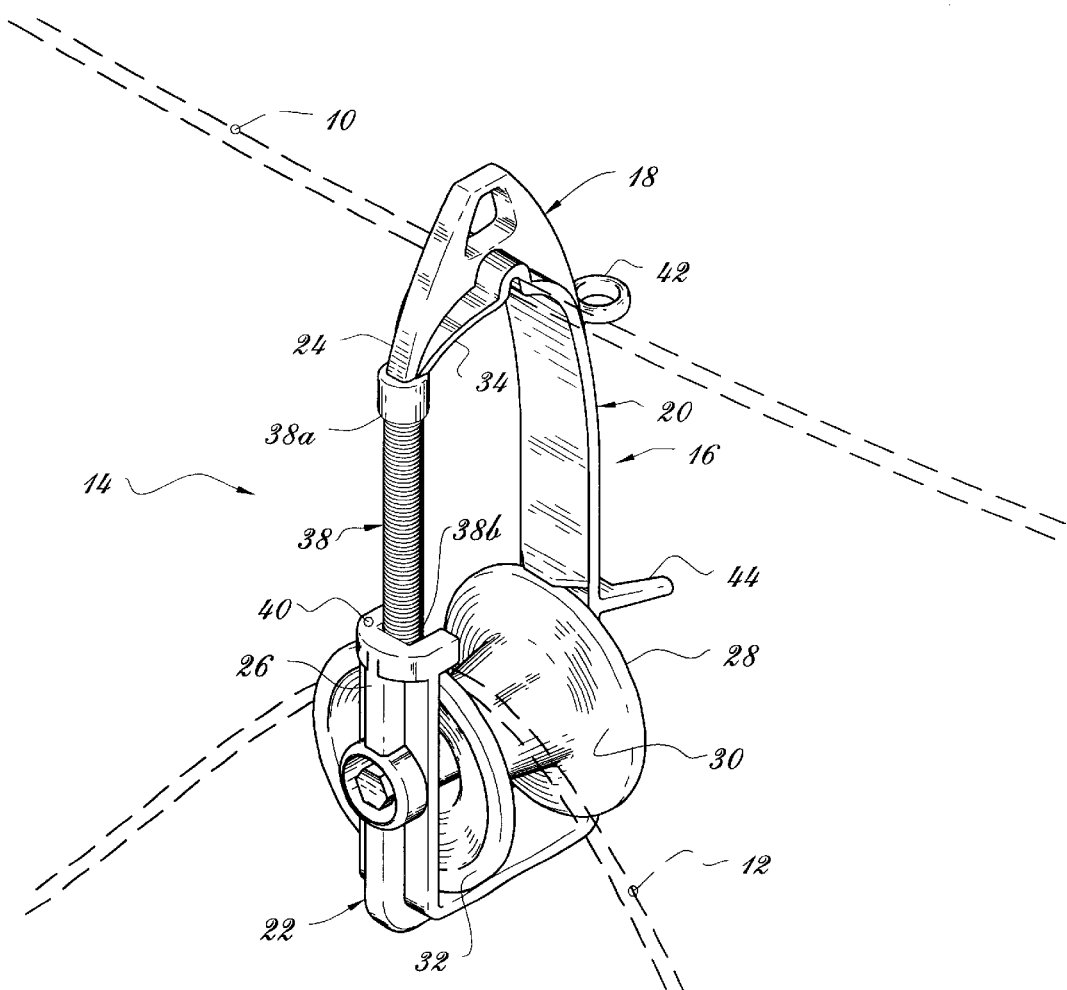
FIG. 2 is an enlarged perspective view of the cable support block of FIG. 1, suggesting in dotted lines the fixed upper cable supporting the support block and the lower cable supported by the cable support block.

As shown in FIGS. 2 and 3, cable support block 14 comprises an arcuate elongated rigid substnatially planar frame 16 defining an upper portion 18, an intermediate portion 20, a lower portion 22, and first and second legs 24 and 26 defining a frame opening therebetween at the frame intermediate portion, 20. Arcuate frame 16 is cross-sectionally T-shaped (FIGS. 2, 4 and 5) along most of its length, presenting a generally flat inner cable-engaging web portion and an outer reinforcing rib transversely outwardly extending from said frame inner web. Frame 16 can be made of any suitable non-conductive material, such as a rigid plastic material.

At its lower portion 22, frame 16 rotatably carries a load-bearing idle roller 28 which axially extends in the general plane of frame 16, for supporting the lower cable 12, idle roller 28 is preferably radially grooved so as to form radial flanges 30, 32 at its two axial ends, so as to prevent lower cable 12 from frictionally sliding against frame 16. Idle roller 28 is located entirely under the frame opening. Roller 28 can be made of any suitable material, preferably a non-conductive material such as a rigid plastic.

At its upper portion 18, frame 16 has an integral upwardly tapered yoke 34 defining a central groove 36 for receiving therein the upper cable 10, yoke 34 thus straddling upper cable 10 for stably supporting support block 14 thereon. As with most of frame 16, yoke 34 and groove 36 are cross-sectionally T-shaped and have a flat inner surface which is suitable for engaging the upper cable 10 which can, due to the tapered shape of yoke 34, slide into groove 36 for a stable support of support block 14 on upper cable 10. Groove 36 is also upwardly tapered, so as to trap upper cables of different diameters. Moreover, under the load of the lower cable 12 which is supported by support block 14 in a manner disclosed hereinafter, frame 16 is downwardly urged which results in a friction fit engagement within groove 36, which thus straddles upper cable 10 in a more secure fashion.

The frame opening is bridged by an elongated coil spring 38 defining a first end 38a fixedly attached to the frame first leg 24, and an opposite free second end portion 38b. Coil spring 38 extends through the frame opening in an unstressed, closed condition, to form with the intermediate and upper portions 20, 18 of frame 16 and with idle roller 28 a closed inner loop 39, for trapping therein the cables 10, 12 to prevent their accidental disengagement from support block 14. As shown in FIG. 3, coil spring 38 is deformable against its own resiliency into an opened condition shown at 38', which is inwardly oriented relative to the support block inner loop 39. The opened condition of coil spring 38 may be any position thereof which allows a cable to be inserted through the frame opening, and thus it may alternately be moved away from second leg 26 in any direction, instead of only inwardly into loop 39. Coil spring 38 can be made of any suitable material, e.g. a corrosion-resistant metallic alloy.

FIGS. 2 and 3 further show that the frame second leg 26 is provided at its upper free end with an integral inwardly-opened arcuate shoulder 40 against which the spring lower end portion 38b can abut in the closed condition of spring 38, to prevent accidental forcible outward or transversal displacement, relative to the inner loop 39, of spring 38 against its own resiliency. Thus, when spring 38 is in its closed condition, shoulder 40 allows only an inward displacement thereof.

FIGS. 2–5 show that on the intermediate portion 20 of C-shaped frame 16, opposite coil spring 38, are provided first and second hook members 42, 44 integrally edgewisely attached on the outer rib of frame 16. First hook member 42 is ring-shaped and is tangentially attached to frame 16.

Second hook member 44 is V-shaped, having a main web integrally attached to frame 16 and a pair of outwardly diverging fingers. First and second hook members 42, 44 are aligned so as to form a straigth channel along the outer edge of frame 16, so as to be engageable by a straight pole as will be detailed hereinafter.

The upper portion 18 of frame 16 is advantageously provided with an integral through-bore 48 for promoting easy hooking storage of cable support block 14.

In use, spring 38 remains in its closed unstressed condition shown as 38 in FIGS. 2 and 3, with its second end portion 38b being partly surrounded by arcuate shoulder 40. To install support block 14 onto an upper cable 10 fixedly supported over ground, support block 14 is manually forcibly urged against the upper cable 10, and more particularly coil spring 38 is forcibly urged against upper cable 10 with sufficient pressure to deformably bias coil spring 38 against its intrinsic resiliency into its opened condition. Cable 10 can then slide inside the inner loop 39, with coil spring 38 returning to its closed position under the bias of its own resiliency when released from the relative pressure exerted thereon by cable 10. Support block 14 can then be manually released, with its upper portion being positioned vertically over its lower portion: due to the fact that the center of gravity of support block 16 is located over but near idle roller 28, and to the curved, upwardly tapered inner surfaces of the inner loop 39, support block 14 is likely to slide along the cable 10 and position itself with its groove 36 straddling the upper cable 10, thus requiring no or little manual positioning thereof. It is consequently easy and quick to install support block 14 on upper cable 10, in great part due to the symmetrical configuration thereof which allows its center of gravity to be substantially centered.

To install a lower cable 12 to be supported by cable support block 14, lower cable 12 is inserted into the inner loop 39 by urging lower cable 12 against coil spring 38, which will deformably yield into its opened condition against the bias of its own resiliency, to allow access into inner loop 39 to lower cable 12, coil spring 38 returning to its closed condition under the bias of its own resiliency upon release of the pressure applied thereon by lower cable 12. Lower cable 12 can then be released and it will be supported by idle roller 28, which will allow longitudinal movement of lower cable 12 through the support block inner loop 39.

Once support block 14 is loaded with the weight of the lower cable 12, cable 10 will insert itself under this load into the tapered groove 36 of support block 14 for secure friction fit engagement therein.

An alternate, safer method of installing support block 14 on upper cable 10 for temporary support of a lower cable 12 thereon, includes the use of a pole conventionally used in power line operations, preferably a telescopic pole, such as pole 46 shown in FIG. 1, which is handled at its proximal end 46a by a workperson W. The workperson first inserts, at ground level, lower cable 12 through the frame opening into inner loop 39 by forcibly moving coil spring 38 into its opened position against its intrinsic resiliency. Coil spring 38 can return to its closed position through the bias of its intrinsic resiliency upon release of the pressure thereon by the lower cable 12.

The workperson then engages the first and second hook members 42, 44 with the pole distal end 46b, which is conventionally equipped with a straight distal end having several transversely projecting short hooks or fingers (not shown) which can releasably engage the ring-shaped first hook member 42 to lift and handle support block 14 with pole 46, while the diverging fingers of second hook member 44 can engage the sides of pole 46 to prevent an undesirable rocking or swaying motion of support block 14 at the upper distal end of pole 46. Thus, the workperson is able to distally handle support block 14 with pole 46 by manually handling the pole proximal end 46a.

With the support block 14 hooked at the distal end 46b of pole 46, support block 14 can be raised over ground to upper cable 10, with lower cable 12 resting against idle roller 28 which allows lower cable 12 to longitudinally move through inner loop 39 by its engagement with support block roller 28, and thus lower cable 12 is not likely to hinder the installation of block 14 on upper cable 10 by undesirable friction therewith.

The support block 14 can then be engaged on upper cable 10 by forcibly abutting coil spring 38 against upper cable 10, whereby coil spring 38 will be forcibly resiliently deformed into its opened condition for allowing access into inner loop 39 to upper cable 10. Coil spring will be biased into its closed position by its intrinsic resiliency upon release of the forcible abutment of upper cable 10 thereagainst. The engagement of the support block hook members 42, 44 with pole 46 may then be released, with the yoke 34, and more particularly the groove 36, of frame 16 straddling upper cable 10 for stable support of support block 14 thereon, while lower cable 12 will effectively be supported by the support block idle roller 28.

With a number of support blocks installed on the upper cable 10, for temporarily supporting the lower cable 12, it is possible to undertake stringing operations on lower cable 12 in a known, conventional manner, and to suitably tension and attach lower cable 12 between successive upright posts, benefitting from the rotatable idle rollers 28 of the cable support blocks 14 that allow a rolling engagement of lower cable 12 thereon.

Thus, it can be seen that the installation of the support blocks is easy to accomplish, and can advantageously be done from ground level with a suitable pole such as pole 46, which reduces significantly the likelihood of injuries occurring from direct human contact with upper cable 10 and from the fact that the work persons operate high above ground level.

To remove the support blocks 14 from the cables 10, 12, once the installation of lower cable 12 is completed, a workperson carried in an aerial basket or the like suitable equipment, manually disengages the support blocks from cables 10, 12, by manually forcibly resiliently deforming the coil spring 38 of blocks 14 into its opened condition, to allow the cables 10, 12 to be removed from inner loop 39 and consequently allow the retrieval of support blocks 14. This opened condition or position of coil spring 38 can correspond, relative to loop 39, to an inwardly deformed condition of spring 38 (FIG. 3), or alternately to a transversely deformed condition or to an outwardly deformed condition of spring 38, the two latter being accomplished by first displacing the spring second end portion 38b inwardly away from 16 frame second leg 26 so as to clear arcuate shoulder 40, and then transversely and perhaps also outwardly displacing the spring second end portion 38b so as to move the latter around shoulder 40 and away from second leg 26. In any case, moving coil spring 38 into its opened condition requires to displace the spring second end portion 38b away from the frame second leg 26, which includes first moving the spring second end portion 38b out of arcuate shoulder 40.

An alternate, safer way to remove a support block 14 from the cables 10, 12, once the installation of lower cable 12 is completed, is to use pole 46 to distally push or poke coil spring 38 inwardly out of shoulder 40 from its closed position, and then transversely and outwardly so that the spring second end portion 38*b* be biased out of C-shaped shoulder 40 and laterally around it, with the intrinsic resiliency of coil spring 38 allowing the coil spring to lie in a slightly deformed condition adjacent and out of C-shaped shoulder 40. In this condition, coil spring 38 can be positioned adjacent shoulder 40, resiliently abutting on the shoulder outer side leg which prevents the spring's intrinsic resiliency from biasing it into its closed position. The pole distal end 46*b* is then inserted into hook member 42 through the channel defined with hook member 44, to distally handle support block 14. The support block 14 is moved to forcibly sequentially abut the upper and lower cables 10, 12, in any order, against coil spring 38 which is now free to outwardly resiliently yield to allow cables 10, 12 to escape inner loop 39, due to the fact that the spring second end portion is located out of arcuate shoulder 40. Thus, support block 14 can be removed from cables 10, 12 and retrieved for further use.

Roller 28 is preferably mounted on its shaft by means of roller bearings, which allow minimum friction during rotational movement of roller 28.

A flexible rope (not shown) can be installed inside inner loop 39 simultaneously with the lower cable 12 for transversely extending therein. The rope is attached to lower cable 12 at regular intervals, and can be manually pulled for tensioning the lower cable between successive support posts, instead of pulling on the lower cable 12 per se.

Any modifications which do not deviate from the scope of the present invention, are considered to be included therein.

For example, it is envisioned that the frame of the cable support block be shaped differently, although the configuration shown in the drawings is the preferred way to carry out the invention. Indeed, it can be seen in FIG. 3 that the frame 16 is substantially symmetrical in front elevation, which confers a more stable engagement of frame 16 onto the upper cable 10.

The coil spring 38 may be replaced by a suitable arm member, such as a rigid arm member, which would be movable with a suitable pivot such as an universal joint, so as to allow the arm member to pivot from a closed position, adjacent the shoulder, to an inwardly opened position so as to clear arcuate shoulder 40 and allow access into the inner loop 39 to cables 10, 12, to a transversely lateral opened position and then to an outwardly opened position, allowing access out of loop 39. A biasing device, such as a resilient coil spring located at the rigid arm member attachment, or the like biasing device, would continuously urge the arm member into its closed position. The universal joint would allow the same freedom of movement to the arm member as the coil spring is allowed due to its resilient deformation, i.e. a displacement inwardly, outwardly and transversely relative to loop 39. An acceptable alternate embodiment would consist of a rigid rod being provided with a short coaxial coil spring attaching it to the frame first leg.

The latter embodiment would be very similar to the one shown in the drawings, but with the arm member being rigid along most of its length from its second end portion to near its first end, though short thereof. Indeed, in the preferred embodiment shown in the drawings, the resilient coil spring 38 acts simultaneously as the arm member, the universal joint and the biasing device, since it bridges the opening of frame 16 in its closed position, and it can be moved or deformed into an opened position in which its second end portion 38 is moved away from the frame opening, either parallel to the plane of loop 39 or transversely thereto, while its intrinsic resiliency allows it to be urged at all times towards its closed position or condition.

Another acceptable alternate embodiment would be to provide a ball joint attaching a rigid arm member to the frame first leg, with a biasing device such as a resilient flexible peripheral sleeve continuously biasing the rigid arm member towards its central closed position.

Furthermore, it could be envisioned that a single hook member be used instead of the two spaced-apart hook members 42, 44, especially if the shape of the single hook member and of the complementary distal end of the pole 46 help prevent undesirable rocking and swaying motion of the support block during distal handling with the pole 46.

Spring 38 may be slightly stressed against shoulder 40 in its closed position for a more secure engagement thereagainst.

Shoulder 40 could be a flat abutment piece instead of an arcuate one, the instrinsic resiliency of the spring 38 then acting to prevent transversal displacement thereof relative to loop 39. This could be envisioned, since accidental transversal pressure on spring 38 is less likely to occur. A high friction surface could be provided inwardly on the flat shoulder, to enhance the resistance to sliding transversal displacement of spring 38 against the flat shoulder. However, it is understood that under a pressure of the inner cables 10, 12 on spring 38 which is oriented outwardly and transversely, relative to loop 39, with the transversal component of the pressure exerted being important enough to overcome the intrinsic resiliency of spring 38, together with any frictional resistance if any, the cable support block 14 could allow accidental and undesirable release of cables 10, 12. Thus, this is not the preferred embodiment, but it remains within the scope of the present invention.

Further obvious modifications to the abovedescribed invention will be apparent to one skilled in the art to which the invention pertains, in view of the following claims.

What is claimed is:

1. A cable support block for temporary engagement thereof onto an upper aerial cable spacedly supported over ground and for temporarily supporting a lower cable near and under the upper cable, said support block comprising:

a rigid arcuate frame defining an opened loop frame portion and an upper yoke in said opened loop frame portion for straddling said upper cable, said frame further defining first and second ends and an opening between said first and second ends allowing throughpassage into and out of said arcuate frame opened loop frame portion;

an idle load-bearing roller rotatably mounted on said frame inwardly thereof and under said opening, for supporting the lower cable;

a shoulder mounted on said frame second leg; characterized in that said support block further comprises:

an elongated coil spring having a first end portion fixedly attached to said first leg and a second opposite free end portion movable relative to said first end portion by resilient deformation of said coil spring, thus allowing said coil spring second end portion to be positioned both adjacent and spacedly around said frame second end; said coil spring being deformable between a closed condition, in which said second end portion lies inwardly adjacent to said shoulder, relative to said arcuate frame, and in which said coil spring bridges said opening, and an opened condition, in which said second end portion is located away from said shoulder and said second leg, consequently allowing access through said opening into and out of said arcuate frame to the lower and upper cables, said coil spring being continuously biased by its own intrinsic resiliency towards said closed condition, whereby accidental release through said opening of the upper and lower cables, both transversely extending inside said frame opened loop frame portion, can be prevented by the outward abutment of said coil spring second end portion against said shoulder when said coil spring is in said closed condition and bridges said opening.

2. A cable support block as defined in claim 1, wherein said shoulder is substantially arcuate and is inwardly opened, relative to said arcuate frame, for preventing, when said coil spring is in said closed condition, in addition to an outward displacement of said coil spring second end portion relative to said arcuate frame, a transversal displacement of said coil spring second end portion relative to said arcuate frame, whereby said coil spring second end portion is allowed an inward displacement, relative to said arcuate frame, when it is in said closed condition.

3. A cable support block as defined in claim 1, wherein said frame comprises a first hook member for engagement therewith by a suitable pole for distally handling said support block with the pole.

4. A cable support block as defined in claim 3, wherein said frame comprises a second hook member for stabilizing said support block by engagement of the pole against said second hook member, in addition to said first hook member, while said support block is distally handled with the pole.

5. A cable support block as defined in claim 4, wherein said first hook member is ring-shaped and is tangentially integrally attached to said frame, and said second hook member is V-shaped and has a web portion integrally fixed to said frame and a pair of diverging fingers, said second hook member being attached spacedly under said first hook member so as to form a channel therewith, with the pole engaging said channel through the ring-shaped first hook member and between the fingers of said second hook member.

6. A cable support block as defined in claim 1, wherein said frame comprises an integral through-bore at its upper portion for promoting easy hooking storage thereof.

\* \* \* \* \*